United States Patent Office 2,773,853
Patented Dec. 11, 1956

2,773,853

METHOD OF PRODUCING STOVING LACQUERS FROM DIMETHYLOL DERIVATIVE OF A DIURETHANE

Adolf Weihe, Kronberg, Taunus, Germany, assignor to Herbig-Haarhaus Aktiengesellschaft Lackfabrik Koln-Bickendorf, Koln-Bickendorf, Germany, a firm No Drawing. Application May 27, 1952,
Serial No. 290,311

9 Claims. (Cl. 260—33.2)

This invention relates to a method of producing stoving lacquers.

The use of stoving lacquers for the production of mechanically and chemically resistant coatings on iron and other metals, particularly on sheets, tubes and machine parts has acquired increasing importance. The demands placed on such lacquers are, however, extremely high. The drying and hardening of the lacquer coating are to be carried out in the minimum time and at high temperatures. A requirement of lacquer layers—especially with the use of black plate (untinned iron plate) for fish preserving boxes—is that they should withstand stamping and bending of the sheets and should also withstand boiling with 5% acetic acid under pressure at 120°.

In the case of lacquers employed for engine wheels and other vehicles, it is desired, in addition to high gloss, weather and light resistance, to obtain increased resistance to shock, scratching and in particular, however, to power fuels.

It is an object of the present invention to provide lacquers which meet said requirements.

It is another object of this invention to provide white and light coloured lacquers which are durable even in the range of high temperatures.

I have found that said objects are achieved to a surprisingly high degree by resin solutions obtained by azeotropic distillation of dimethylol compounds of primary diurethanes or aqueous solutions thereof, viz. compounds having the general formula:

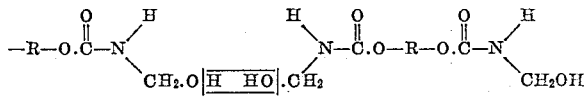

The azeotrope employed with advantage comprises mixtures of alcohols with aromatic hydrocarbons which facilitate the distillation below 100° of the main water content.

In the above formula R signifies any desired divalent residue which may also contain heteratoms.

In carrying out the azeotropic distillation the water is preferably continuously removed from the distilled solvent which is continuously run back into the distillation vessel. Lacquers may thus directly be obtained that are ready for use and which, if necessary, may be suited to any particular use or kind of manufacture by the addition of substances employed in the lacquer art in regard to their bodily content, time of evaporation, speed of hardening and so on. If it is desired to obtain solutions that are particularly rich in body, as is necessary for example for roller coating by means of a lacquer machine, the solutions dehydrated by azeotropic distillation are subjected to an after treatment in vacuum in order to eliminate excess solvent.

For most purposes, and when employing an effective stirrer, the vacuum treatment however is not necessary.

A particular advantage of this method consists in the fact that proceeding from readily accessible water-soluble dimethylol compounds, it is possible to obtain in one working operation lacquers ready for use, by adapting the solvent mixture employed for the azeotropic removal of water to the intended use of the lacquer. By measuring the separated water, the end point of the reaction may be exactly ascertained.

The steps in the azeotropic distillation are as follows:
1. Removal of non-chemically combined water.
2. Expulsion of water from the dimethylol compound with formation of methylene ether bonds or bridges according to the following formaula:

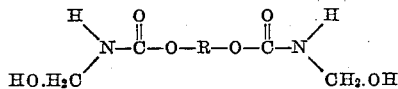

In this form, the resin is dissolved after completion of the distillation. Depending upon the operating conditions, more or less free methylol groups may still be present.

With a view to obtaining a resin solution adapted for spray lacquering there may be employed for the azeotropic distillation, for example, mixtures of n-butanol, secondary butanol or amyl alcohol with benzol, toluol or xylol; the resin solution dehydrated by azeotropic distillation and, if desired, freed from a part of the solvent may be treated with suitable solvents such as glycol ethers, ketones, diacetone alcohol and benzyl alcohol in order to control the flow and speed of vaporisation.

In order to obtain a resin solution suitable for coating by means of a lacquering machine, it is advantageous for the azeotropic distillation not to employ the above mentioned intermediate boiling substances but to employ pronounced high boiling substances such as octanol (for example 2-ethyl-hexanol-1) or corresponding high boiling alcohols advantageously mixed with higher boiling aromatic hydrocarbons like xylol, mesitylene or diethyl benzol. The azeotropic distillation may also be effected under vacuum with the object of keeping the temperature of the resin solution below 100° C. during the distillation. Lustre and flow of the lacquer may be influenced by the addition of substances usual in the lacquer art, such as crotonic acid, benzoic acid and so forth. The working in of pigments presents no peculiarities compared with those hitherto known.

The products possess a surprisingly high pigment compatibility and in this respect differ advantageously from urea resins.

Example 1

An induction heated stirring vessel of 1 cbm. content, made of refined steel and having the usual auxiliary apparatus necessary for azeotropic distillation with separation of the water and continuous return flow of the solvent is charged with 335 kg. of an aqueous 33% solution of the dimethylol compound of the butandiolbiscarbamate

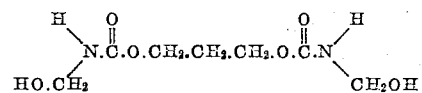

and 260 kg. of secondary butanol. After thorough mixing, the liquid is adjusted with phosphoric acid to pH 4.5; for this purpose, a 10% solution of concentrated commercial phosphoric acid in secondary butanol is employed.

Heating is effected until boiling occurs and, as soon as distillation starts up, 180 kg. toluol is run in within about 2 hours. The cooled distillate before being run back into the vessel passes through a separating chamber in which the water settles and is drawn off. The process is completed when no further separation of water occurs and the distillate runs off free from turbidity. The separated quantity of water amounts to about 230 kg.

The temperature of the reaction fluid is 82° C. at the beginning of the distillation and rises at the end to 92° C.

The resin solution obtained is cooled to 45° C. and so much solvent is distilled under vacuum of a 40 mm. mercury column that about 67% resin solution is obtained. This has a viscosity of about 8000 centipoises at 20° C. and consequently corresponds in magnitude to the viscosity of castor oil.

The distilled solvent mixture is employed for further preparations.

In order to produce a lacquer for spraying, the 67% solution obtained is additionally treated as follows:

(a) 600 parts resin solution.
170 parts n-butanol.
170 parts methyl ethyl ketone.
38 parts diacetone alcohol.
12 parts benzyl alcohol.
10 parts crotonic acid.

1000

A lacquer of this composition is suitable for producing lustrous and scratch-resistant coatings and is controlled so as to be capable for being sprayed. If necessary, the lacquer may be diluted before being used with a mixture of butanol and methyl ethyl ketone.

The lacquer is stoved at:

120° in 30 minutes.
140° in 20 minutes.
160° in 15 minutes.
180° in 8 minutes.

The lacquer coating adheres excellently to black plate, tin plate and aluminium.

(b) Lacquer resistant to power fuels and having a black high gloss is obtained with the following ingredients:

600 parts of the resin solution.
4 parts carbon black, for example carbon lacquer.
2 parts Sudan black.
10 parts crotonic acid.
170 parts n-butanol.
170 parts methyl ethyl ketone.
38 parts diacetone alcohol.
6 parts benzyl alcohol.

1000

In order to obtain layers resistant to working substances, the lacquer is stoved at 140° C. at least.

Dilution is effected as in (a).

(c) Primer for the preceding lacquer, capable of being ground.

540 parts of the resin solution.
250 parts of iron oxide black.
20 parts carbon black.
5 parts phosphoric acid in 45 parts of butanol.
60 parts butanol.
25 parts diacetone alcohol.
50 parts methyl ethyl ketone.
5 parts benzyl alcohol.

1000

To be stoved in 30 minutes at 140° C. Dilution as in (a) and (b).

(d) Painter's enamel white for spraying:

600 parts resin solution.
160 parts titanium dioxide.
70 parts blanc fix.
50 parts methyl ethyl ketone.
50 parts butanol.
7 parts phosphoric acid in.
63 parts butanol.

1000

The stoved layers appear completely pure white and do not discolour even with long heating at 150°. They have, however, a dead finish. In order to obtain a high gloss, a top coating of clear lacquer according to (a) above may be applied.

(e) Painter's enamel scarlet for spraying.

600 parts resin solution.
45 parts permanent red R extra.
190 parts blanc fix.
50 parts methyl ethyl ketone.
55 parts n-butanol.
6 parts phosphoric acid in.
54 parts n-butanol.

1000

Luminous red lacquers are obtained, the lustre of which may be enhanced by over-coating with the clear lacquer given at (a).

The lacquer expert will encounter no difficulties in obtaining any other desired colour tones.

*Example II*

600 kg. of a 33% aqueous solution of the dimethylol compound according to Example I are substantially freed from water in a vacuum of 16–20 mm. with agitation in such a manner, however, that the temperature of the solution does not exceed 80°. According to the degree in which the water is distilled off, a further 300 kg. of the same solution is run in and the distillation continues until about 500 kg. of water is distilled off.

There is next added 300 kg. of octanol (2-ethyl-hexanol-1) and 100 kg. of n-butanol. With brisk stirring, 25 kg. of an 8% butanolic phosphoric acid are run in and heated up to the commencement of distillation. According to the degree of separation of water from the distillate xylol is added to a total of 300 kg. After the separation of water is completed, a change over to vacuum distillation is effected and so much of the solvent is distilled off that practically only octanol is present as a volatile constituent. An approximate 60% solution of the resin in octanol is obtained and may be used immediately as a colourless lacquer (so-called silver lacquer) for working up in the lacquering machine (roller coating). The coating is stoved for 15 minutes at 180°. The lacquer coatings have a high gloss, are colourless and are boiling resistant. The resin solution may reach a considerably higher concentration in vacuum, approximately to a solid content of 80%.

400 parts of this 80% solution are mixed with
60 parts diacetone alcohol.
60 parts benzyl alcohol.
20 parts glycol monoethyl ether.
9 parts crotonic acid.

A lacquer suitable for roller coating is obtained, such lacquer having a solid content of 55% and a viscosity of 4 min. in the Ford viscosimeter.

Stoving conditions: 15 minutes 180° C.

Sheets coated with these two lacquers are preeminently suitable for stamping and are resistant to boiling action; they are suitable for the production of preserving boxes. No difficulties arise with regard to pigmentation.

*Example III*

In place of the dimethylol compound of the butanol-diol-biscarbamate treated according to Examples 1 and 2, the 2 CH$_2$ groups of richer, higher homologues, the dimethylol compound of hexandiol-biscarbamate is employed. The working up to form lacquers is effected by the same process. The markedly higher elasticity and pigmentation capacity of the product is advantageous.

Apart from the uses indicated in Examples 1 and 2, valuable enamel lacquers for covering wires may be made.

Example IV

Particularly high elasticity with, however, less hardness is obtained with corresponding products of thiodiglycol.

HO.CH₂.CH₂.S.CH₂.CH₂.OH

The dimethylol compound employed as the starting material for the formation of the resin has the formula:

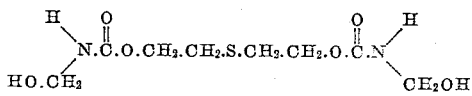

Example V.—Without the addition of hydrocarbons as auxiliary fluid 45 kg. of the 33% solution according to Example I of the dimethylol compound of butandiol-bis-carbamate, adjusted with 10% phosphoric acid to pH=4, is mixed with 12.5 kg. of 2-ethyl-hexanol-1 (octanol) in a 70 litre stirring vessel made of refined steel and having vacuum distillation apparatus and is heated to 80°.

The water is distilled off in a vacuum of 15–20 mm., care being taken that the temperature of the charge does not exceed 95°. Within about 3 hours, about 30 kg. water pass over with about 0.4 kg. octanol. Towards the end of distillation, the charge increasingly concentrates. As soon as the yield of water is completed, the heating is interrupted, the charge is quickly cooled, and simultaneously 3 kg. of glycol mono-ethyl ether are added. After lifting of the vacuum, the warm resin solution at about 60° is drawn off. There is obtained 28.5 kg. of a viscous solution having a dry content of 78.7%. The resin solution is mixed with benzyl alcohol, diacetone alcohol, glycol mono-ethyl ether and crotonic acid according to Example II to be ready for the lacquering machine.

What I claim is:

1. Process for producing a resin to be utilized as a stoving lacquer, comprising preparing an aqueous solution of a dimethylol derivative of a diurethane, mixing said solution with at least a single organic solvent as an azeotropic agent, adjusting the mixture to an acidic pH value, subjecting the mixture to azeotropic distillation to dehydrate the mixure and form methylene ether bridges according to the following formula

wherein R is a bivalent group, and allowing the resin formed to dissolve in said solvent.

2. In the process according to claim 1, using a dimethylol derivative of a diurethane selected from the group consisting of butandiol-bis-carbamate, hexandiol-bis-carbamate, and thiodiglycol-bis-carbamate.

3. A process as set forth in claim 1, in which said azeotropic distillation is effected under vacuum and below a temperature of 100° C.

4. A process as set forth in claim 1, in which said dissolved resin is treated in vacuum for eliminating a part of the solvent.

5. A process as set forth in claim 1, in which said organic solvent comprises a mixture of an alcohol with an aromatic hydrocarbon for facilitating the distillation below 100° of the main water content.

6. A process as set forth in claim 5, in which said mixture comprises substances boiling at medium temperatures.

7. A process as set forth in claim 5, in which said mixture comprises high boiling substances.

8. A process for producing a stoving lacquer, which comprises boiling a mixture of a water soluble dimethylol derivative of a diurethane having the general formula:

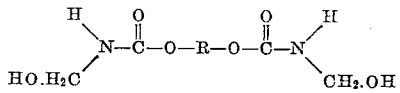

in which R signifies a bivalent group, with an azeotropic agent in a distillation vessel for dehydrating said dimethylol derivative, cooling the distillate consisting of water and said azeotropic agent, removing water from said distillate, recycling said agent into said distillation vessel, and measuring the removed water to ascertain the completion of the dehydrating step.

9. A process for producing a stoving lacquer, which comprises adjusting an aqueous 33% solution of the dimethylol derivative of butandiolbiscarbamate of the formula

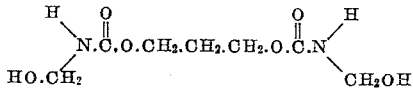

with phosphoric acid to pH=4, mixing said derivative with 2-ethyl-hexanol-1 (octanol), heating the mixture in a vacuum of 15–20 mm. to a temperature not exceeding 95° C. to distill off water, quickly cooling the resulting product as soon as the removal of water is completed, and adding simultaneously glycol mono-ethyl ether.

References Cited in the file of this patent

UNITED STATES PATENTS

| | | |
|---|---|---|
| 2,260,890 | Edgar | Oct. 28, 1941 |
| 2,361,715 | Swain | Oct. 31, 1944 |
| 2,403,450 | Morton | July 9, 1946 |

FOREIGN PATENTS

| | | |
|---|---|---|
| 491,449 | Great Britain | Sept. 1, 1938 |